United States Patent

[11] 3,566,037

[72] Inventor Roland H. Fichtner
Waterloo;Ontario, Canada

[21] Appl. No. 784,744
[22] Filed Dec. 18, 1968
[45] Patented Feb. 23, 1971
[73] Assignee Electrohome Limited
Kitchener;Ontario, Canada

[54] STEREOPHONIC F.M. RECEIVERS HAVING AUTOMATIC SWITCHING MEANS FOR STEREO RECEPTION

7 Claims, 2 Drawing Figs.

[52] U.S. Cl. .......... 179/15
[51] Int. Cl. .......... H04j 3/04
[50] Field of Search .......... 179/15(ST)

[56] References Cited

UNITED STATES PATENTS

| | | | |
|---|---|---|---|
| 3,264,414 | 8/1966 | Santilli | 179/15(ST) |
| 3,309,464 | 3/1967 | Pietrolewicz | 179/15(ST) |

*Primary Examiner*—Ralph D. Blakeslee
*Attorney*—Peter W. McBurney

ABSTRACT: "Motorboating" of an FM receiver adapted to reproduce both monaural and stereophonic signals is avoided by means of a positive feedback network connected between the output and input circuits of the frequency multiplier of the decoder of the receiver, the feedback network causing the amplifying device of the frequency multiplier, once conduction thereof has started, to be driven quickly into full conduction, the result being that a stronger signal is required to switch the decoder from its monaural to stereophonic operating condition than is required to switch the decoder from its stereophonic to monaural operating condition.

PATENTED FEB 23 1971

3,566,037

Figures 1, 2:
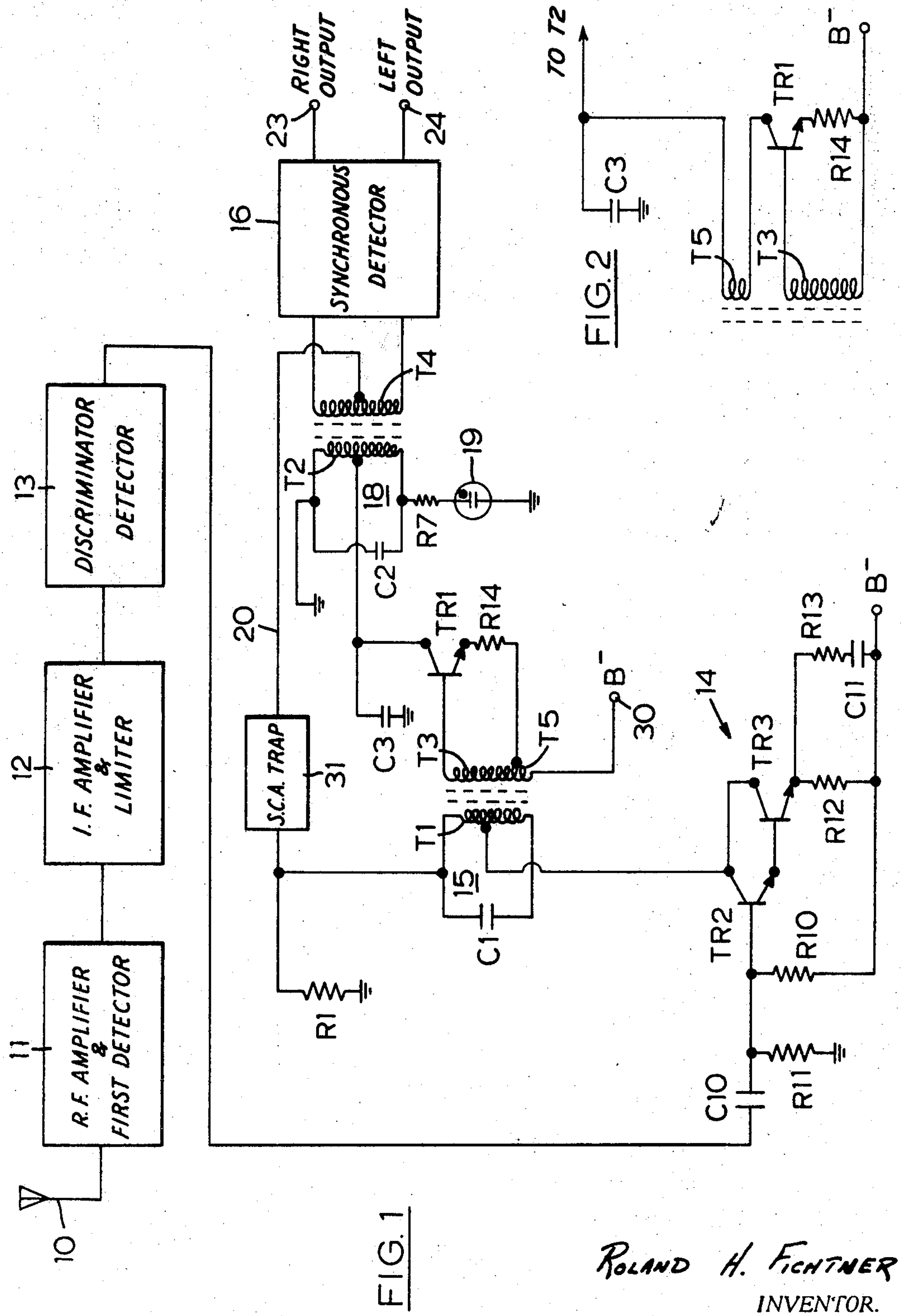

ROLAND H. FICHTNER
INVENTOR.

BY [signature]

PATENT AGENT

STEREOPHONIC F.M. RECEIVERS HAVING AUTOMATIC SWITCHING MEANS FOR STEREO RECEPTION

This invention relates to F.M. receivers. More specifically, this invention relates to stereophonic decorders for FM receivers.

In accordance with regulations currently prescribed by the F.C.C. in the United States and D.O.T. in Canada, the composite signal for use in FM multiplex transmission must have the following mathematical form:

$$M(t) = (L+R) + (L-R)\cos \omega t + P \cos \frac{2}{\omega} t$$

where $M(t)$ is the composite signal

L is the left channel audio signal

R is the right channel audio signal

P is the pilot carrier amplitude $\omega = 2\pi f, f$ presently being 38 kHz.

In the foregoing equation, $(L+R)$ is the sum of the left and right audio channel signals and, therefore, is called the monophonic signal. An FM receiver which is not equipped to reproduce stereophonic signals will reproduce the $(L+R)$ signal only. $(L-R)\cos \omega t$ represents the difference between the left and right audio channel signals amplitude modulated onto a 38 kHz. carrier which is suppressed prior to transmission of the composite signal $P \cos \omega/2\, t$ is a 19 kHz. pilot carrier.

It will be noted that the amplitude modulated carrier (38 kHz.) is harmonically related to the pilot carrier (19 kHz.) the frequency of the latter being exactly one half of the frequency of the former. In addition, the amplitude modulated carrier and the pilot carrier are in phase. The pilot carrier is a necessary part of the composite signal, since it serves the function of reintroducing the suppressed 38 kHz. carrier into the composite signal in the FM multiplex receiver. It can be said that the pilot carrier is a synchronization signal for the correct decoding to the composite signal at the receiver.

In addition to the foregoing components, the composite signal may contain and S.C.A. signal for store casting or subscription music transmission, the use of this signal by the broadcaster being optional. The frequency spectrum of the S.C.A. channel presently is 67±7 kHz.

The monophonic signal can frequency modulate the FM broadcast carrier up to 80 percent if S.C.A. is present, or up to 90 percent with no S.C.A., of the maximum modulation (± 75 kHz.) permitted by the F.C.C. and D.O.T. regulations. The stereophonic signal also can modulate up to 80 percent with both side bands, or 40 percent with each side band, of the maximum modulation if S.C.A. is present, these figures being 90 percent and 45 percent respectively with no S.C.A. The pilot carrier modulates up to 10 percent. i.e., ± 7.5 kHz. assuming 100 percent modulation to be ± 75 kHz. Thus, for FM multiplex transmission, present regulations require an RF signal which may be modulated by the following signals in the noted frequency bands:

$L + R$ from 0 to 15 kHz., $L - R$ in the form of ± (0 to 15) kHz. sidebands of 38 kHz. subcarrier with carrier suppressed and in the band 23 to 53 kHz.

A pilot carrier at 19 kHz.

A subsidiary carrier (S.C.A.) occupying a band from 60 to 74 kHz.

In an FM multiplex receiver a decoder must be provided to derive the audio $L$ and $R$ signals and separate them from each other for individual reproduction. In a conventional FM receiver adapted to reproduce both monaural and stereo signals, it is common practice to provide for automatic switching, i.e., when a stereo signal with its 19 kHz. pilot carrier is being received and is of a predetermined minimum strength, the stereo decoder of the receiver will switch automatically from a monaural operating condition to a stereophonic operating condition, and when the 19 kHz. pilot carrier is absent from the signal being received, the decoder will revert automatically to its monaural operating condition.

It is very desirable that a stronger signal should be required to effect the switching from the monaural operating condition to the stereo operating condition than would be required for switching from the stereo operating condition to the monaural operating condition. This will prevent what is known as "motorboating," such as would otherwise occur if the signal strength were just above the level required to effect switching from the monaural operating condition to the stereo operating condition and from time to time varied in strength to just below the switching level.

In the past "motorboating" has been prevented by the use of a Schmitt trigger circuit (a bistable multivibrator using two transistors). The Schmitt trigger circuit is driven by the current from a frequency doubler, this current being indicative of the pilot carrier level of the incoming signal. The output signal from the trigger circuit is used to light an indicator lamp for stereo operation, and it may be used to DC bias the diodes of a balanced diode switch for monaural operation.

In accordance with this invention there is provided a circuit arrangement which prevents "motorboating" and in which the trigger circuit is eliminated, being replaced by a positive feedback network thereby reducing transistor requirements from 3 to 1 at the cost of a positive feedback network.

In a circuit embodying this invention there is a frequency multiplier that includes an input circuit, an output circuit and an amplifying device. The input circuit includes a tuned circuit tuned to the frequency of the pilot carrier, while the output circuit includes a tuned circuit tuned to a frequency corresponding to an integral multiple of the frequency of the pilot carrier, most commonly to a frequency equal to twice the frequency of the pilot carrier. A positive feedback network including a coil is connected between the output and input circuits of the frequency multiplier and causes the amplifying device thereof, once conduction of the amplifying device has started, to be driven quickly into full conduction, the result being that a stronger signal is required to switch the decoder, of which the frequency multiplier is a part, from its monaural to its stereophonic operating condition than is required to switch the decoder from its stereophonic to monaural operating condition.

This invention will become more apparent from the following detailed description, taken in conjunction with the appended drawings, in which:

FIG. 1 shows part of an FM radio receiver that includes a stereo decoder embodying this invention; and FIG. 2 is a circuit diagram of a modified circuit that may be used in place of a part of the circuitry shown in FIG. 1.

Referring to FIG. 1, FM signals are received by an antenna 10 and are amplified and detected by a conventional RF amplifier and first detector 11. The detected signal is amplified and limited by a conventional IF amplifier and limiter 12, and the composite signal representing the modulation of the received signal then is detected by a conventional discriminator detector 13. This signal is amplified by a wideband amplifier 14 and applied to a stereo decoder embodying this invention.

As shown in FIG. 1, there is provided a parallel tuned network 15 consisting of the primary winding T1 of a transformer and a capacitor C2 connected in parallel with primary winding T1. Parallel tuned network 15 is tuned to the frequency of the pilot carrier (19 kHz. in accordance with present F.C.C. and D.O.T. regulations) of the composite F.M. signal received by antenna 10. The signal from amplifier 14 is applied to a center tap on primary winding T1.

Wideband amplifier 14 may be of various known types, but is shown as consisting of two transistors TR2 and TR3 having their collector electrode connected together and to the center tap on primary winding T1. Operating bias for transistor TR2 is provided by connecting the base electrode thereof to a source of negative DC potential (B−) via a resistor R10 and to ground via a resistor R11, these two resistors constituting a voltage divider network. A coupling capacitor C10 is connected between the output terminal of detector 13 and the base electrode of transistor TR2. The emitter electrode of transistor TR2 is directly connected to the base electrode of transistor TR3, while the emitter electrode of the latter is connected to B— via a resistor R12 and also via a series circuit consisting of a resistor R13 and a capacitor C11.

A transistor TR1 connected in common emitter configuration and operating as an amplifier under class C conditions constitutes the active element of a frequency doubler network. It should be understood of course, that other amplifying devices, such as, for example, a vacuum tube could be used in place of a transistor TR1. In the output circuit of this frequency doubler there is a parallel tuned circuit 18 which is tuned to 38 kHz., i.e., to the frequency of the suppressed carrier or twice the frequency of the pilot carrier. Tuned circuit 18 consists of the primary winding T2 of a transformer and a capacitor C2 that is connected in parallel with winding T2. The collector electrode of transistor TR1 is connected to a tap winding T2. A capacitor C3 is connected between the tap on winding T2 and ground and serves to suppress high frequency ringing. One terminal of tuned circuit 18 is connected directly to ground, while the other terminal is connected via a resistor R7 and a neon tube stereo indicator lamp 19 to ground.

The secondary winding T3 of the transformer for which winding T1 is the primary winding is, of course, transformer coupled with primary winding T1 and has one of its terminals connected to the input or base electrode of transistor TR1. The other terminal of secondary winding T3 is connected via a tertiary winding T5 to a terminal 30 at a negative DC potential (B—). The emitter or common electrode of transistor TR1 is connected via a resistor R14 and tertiary winding T5 to terminal 30, so that tertiary winding T5 is in a circuit that includes the output and common electrodes of transistor TR1.

The secondary winding T4 of the transformer of which T2 is the primary winding is connected to a synchronous detector 16 of known type, so that a switching voltage may be applied to detector 16 when the receiver is receiving a composite signal that is of a minimum predetermined strength and that includes a 19 kHz. pilot carrier. As is conventional, the upper terminal of tuned circuit 15 is connected via a conductor 20 and a S.C.A. trap or filter 31 to a center tap on winding T4. Trap 31, which may comprise an inductor and a capacitor connected in parallel with each other, is tuned to reject the 67 kHz. "storecasting" signal that are sometimes transmitted to ensure that this signal is not applied to the center tap on winding T4. The upper terminal of tuned circuit 15 also is connected to ground via a resistor R1.

Of course, detector 16 may be of various types and may be a balanced diode switch, for example. In this event, connections from the upper terminal of tuned circuit 15 and from wideband amplifier 14 that are shown in detail in U.S. Pat. No. 3,372,238 for Stereophonic Decoders for FM Receivers, issued Mar. 5, 1968 and assigned to the same assignee as the instant application may be used.

Detector 16 has a right output terminal 23 and a left output terminal 24 at which the right and left audio signals of the composite signal appear when a signal above a minimum predetermined strength and containing stereo information and a pilot carrier is being received by the receiver.

In the modification shown in FIG. 2 tertiary winding T5 is connected between the collector electrode of transistor TR1 and the tap on winding T2. In both embodiments, however, windings T3 and T5 are transformer coupled and are so connected and wound that winding T5 is adapted to induce a voltage in winding T3 in response to conduction of transistor TR1 as a result of the application of a signal at the frequency of the pilot carrier to the base electrode of transistor TR1 that is in phase with the voltage of pilot carrier frequency that is induced in winding T3 by current flow in winding T1.

The operation of the circuit of FIG. 1 now will be described. Under no signal conditions, i.e., no signal being supplied to the base electrode of transistor TR1, the transistor will be turned off, since zero bias is applied across the base emitter junction thereof. When a signal is being received by the receiver but contains no 19 kHz. pilot carrier, no signal will be developed across tuned circuit 15, and hence no signal will be applied to the base electrode of transistor TR1. Consequently, transistor TR1 will remain cut off with no current flowing in its collector circuit, and no switching voltage will be developed across tuned circuit 18. Under these circumstances the detector will be in its monaural operating condition. The signal detected by detector 13 will be amplified by amplifier 14 and applied to the center tap on winding T4 via trap 31 and conductor 20. Identical audio signals will be derived at output terminals 23 and 24.

When a signal of a minimum predetermined strength and that includes a 19 kHz. pilot carrier is being received, this signal will be amplified by amplifier 14, and a 19 kHz. voltage will be developed across tuned circuit 15. The positive peaks of the voltage that necessarily will be developed across winding T3 will drive transistor TR1 into conduction. Collector current pulses will flow in the collector circuit of transistor TR1, and a 38 kHz. switching voltage will be developed across tuned circuit 18 and across winding T4. Emitter current pulses also will flow in the emitter circuit of transistor TR1 and through tertiary winding T5. This flow of current through tertiary winding T5 will induce a voltage in winding T3 that is in phase with the voltage induced therein by 19 kHz. current flowing through winding T1. Because of this, transistor TR1 will be driven quickly into hard conduction and will saturate, limiting the voltage developed across winding T2. The decoder now is operating in its stereophonic mode. At some time during switching of the decoder from its monaural to stereophonic mode of operation sufficient voltage will be developed across winding T2 to fire indicator lamp 19, which provides visual indication that the decoder is operating in its stereophonic mode.

Transistor TR1 operates as a nonoscillatory amplifier, and it will be seen from the foregoing that the positive feedback network that is provided quickly increases the degree of conduction of transistor TR1 in response to turning on of the transistor by the application of a signal at pilot carrier frequency to its base electrode.

It will be understood, of course, that in the stereo mode of operation detector 16 will be supplied with the 38 kHz. switching voltage developed across winding T4 as well as the signal applied to the center tap of winding T4 via conductor 20 and will operate in a known manner to decode the signal with the left audio signal being supplied to output terminal 24 and the right audio signal being supplied to output terminal 23. It will be understood that these audio signals will be supplied to deemphasis networks and then may be further amplified, if necessary, and other wise conventionally processed, eventually being applied to loudspeakers or other sound reproducing devices.

Should the signal being received now drop slightly below the minimum level that is required to initiate switching from the monaural to the stereo operating condition, switching from the stereo operating condition to the monaural operating condition will not result because of the positive feedback network. If the signal strength drops appreciably below this minimum level, however, transistor TR1 will turn off quickly because of removal of the positive feedback. The level of the signal that is required to switch the decoder from its stereo to its monaural operating condition is lower than the level of the signal required to switch the decoder from its monaural to stereo operating condition because, when the decoder is operating in its stereo mode, a part of the voltage applied across the base-emitter junction of transistor TR1 is provided by the positive feedback network and a part is provided by transformer coupling with winding T1, whereas when the decoder is in its monaural mode of operation and is being switched to its stereo mode, all of the voltage initially applied across the base-emitter junction of transistor TR1 is obtained from transformer coupling with winding T1, so that when the decoder is in its stereo mode, the voltage developed across winding T3 due to transformer coupling with winding T1 can drop to a lower level with transistor TR1 still remaining in conduction than the level required to initiate conduction of transistor TR1. In other words, if V1 is the voltage required across the base-emitter junction of transistor TR1 for current to flow in its output circuit, V2 is the voltage induced in winding T3 by 19 kHz. current flowing through winding T1 and V3 is the voltage induced in winding T3 by current flowing in the emitter circuit of transistor TR1 through tertiary winding T5, then V2 must equal V1 to initiate switching from the monaural mode to the stereo mode, whereas switching from the stereo mode to the monaural mode will not occur until V2 plus V3 decreases to just below V1, which necessarily means that V2 is less for switching from the stereo mode to the monaural mode than it is for switching from the monaural mode to stereo mode.

It will be understood that when the decoder switches from its stereo to its monaural mode of operation, no further switching voltage will be developed across tuned circuit 18, indicator lamp 19 will extinguish and transistor TR1 will return to its zero bias (cut off) condition.

It will be appreciated, of course, that should the signal being received change from a signal with a 19 kHz. pilot carrier to a signal without such a pilot carrier, the decoder will switch automatically to its monaural operating condition regardless of signal strength.

The circuit of FIG. 2 operates in the same way as hereinbefore described except that collector current pulses in tertiary winding T5 induce in secondary winding T3 a voltage that is in phase with the voltage induced therein by flow of 19 kHz. current through primary winding T1.

It was noted previously herein that when transistor TR1 has been turned on, the positive feedback network will ensure that the transistor will be quickly driven into saturation. This is desirable because noise thereby will be prevented from riding through the frequency doubler to detector 16.

In the circuit of FIG. 1, transistor TR1 is the active element of a frequency doubler network. A part of this network is constituted by a circuit 18 tuned to the frequency (38 kHz.) of the suppressed carrier. While present F.C.C. and D.O.T. specifications make the use of a frequency double necessary, it will be appreciated that should these regulations change, a frequency quadrupler, for example, might be required. Also this invention can be readily employed with certain bridge detection networks where a multiple frequency of the 38 kHz. carrier is used. In this case too, transistor TR1 could operate as frequency quadrupler.

While preferred embodiments of this invention have been disclosed herein, those skilled in the art will appreciate that changes and modifications may be made therein without departing from the spirit and scope of this invention as defined in the appended claims.

I claim:

1. In an FM receiver adapted to receive a composite signal containing a monophonic signal $(L + R)$, a pilot carrier and the sideband frequencies of a carrier suppressed carrier amplitude modulated by an $L - R$ signal, said suppressed carrier being of a frequency harmonically related to the frequency of said pilot carrier and to separate $L$ and $R$ audio frequency signals from said composite signal, a decoder comprising a frequency multiplier network for producing a switching voltage at a frequency corresponding to an integral multiple of the frequency of said pilot carrier; said frequency multiplier including an input circuit, an output circuit, an amplifying device having input, output and common electrodes and means biasing said amplifying device to a nonconductive condition in the absence of a signal applied to said input electrode; said decoder being adapted to switch automatically from a monaural operating condition wherein said amplifying device is nonconductive to a stereophonic operating condition wherein said amplifying device operates as a nonoscillatory amplifier when a signal containing said pilot carrier and of a minimum predetermined strength is being supplied to said input electrode and also adapted to switch automatically from said stereophonic operating condition to said monaural operating condition when a signal containing said pilot carrier and of a strength lower than said minimum predetermined strength is being supplied to said input electrode, said decoder also being adapted to switch automatically from said stereophonic operating condition to said monaural operating condition when a signal that is without said pilot carrier is being supplied to said input electrode; said input circuit including (a) a first tuned circuit tuned to the frequency of said pilot carrier and including a first coil and (b) means including a second coil transformer coupled with said first coil and connected to said input electrode to supply a signal at the frequency of said pilot carrier to said input electrode when a signal containing said pilot carrier is supplied to said first tuned circuit; said output circuit including a second tuned circuit tuned to the frequency of said switching voltage, said second tuned circuit being connected in a circuit including said common and output electrodes for producing said switching voltage in response to conduction of said amplifying device by application of a signal at the frequency of said pilot carrier to said input electrode; and a positive feedback network for automatically increasing the degree of conduction of said amplifying device in response to turning on of said amplifying device by application of a signal at the frequency of said pilot carrier to said input electrode, said positive feedback network including a third coil transformer coupled with said second coil and connected in a circuit including said common and output electrodes and adapted to induce a voltage in said second coil in response to current flow in said circuit including said common and output electrodes resulting from application of a signal at the frequency of said pilot carrier to said input electrode that is in phase with the voltage at the frequency of said pilot carrier induced in said second coil by current flowing in said first coil.

2. The invention according to claim 1 wherein said amplifying device is a transistor having base, collector and emitter electrodes, said input electrode being said base electrode, said common electrode being said emitter electrode and said output electrode being said collector electrofe.

3. The invention according to claim 2 wherein said third coil is connected between said collector electrode and said second tuned circuit.

4. The invention according to claim 2 including a terminal at a DC potential, said third coil being connected between said terminal and said emitter electrode and also between said terminal and said second coil.

5. The invention according to claim 1 wherein said third coil is connected between said second tuned circuit and said output electrode.

6. The invention according to claim 1 including a terminal at a DC potential, said third coil being connected between said terminal and said common electrode and also between said terminal and said second coil.

7. The invention according to claim 1 including a stereo indicator lamp connected between said second tuned circuit and a terminal at a reference potential.